July 2, 1957 J. S. WADDELL 2,797,652
DOUGHNUT MAKING MACHINE
Filed Jan. 3, 1956 2 Sheets-Sheet 1
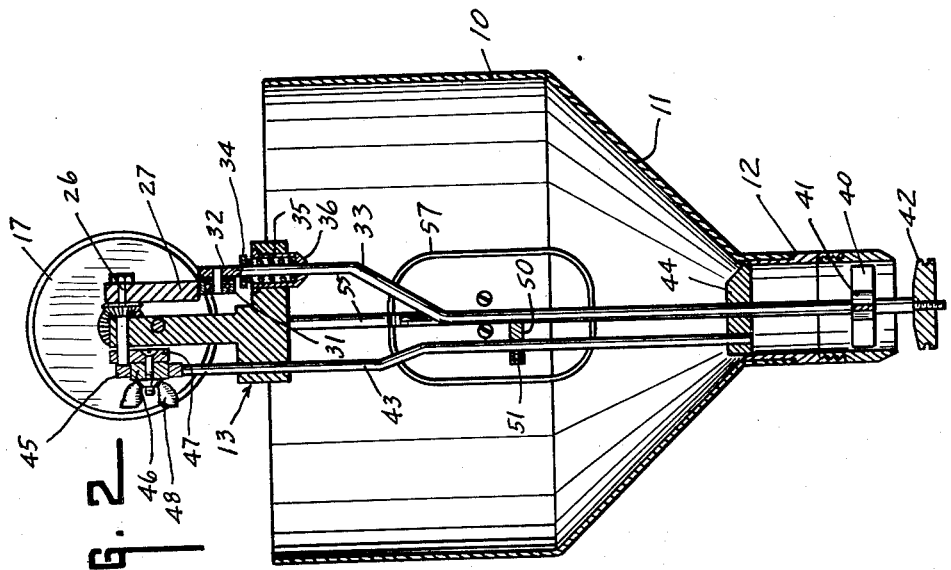
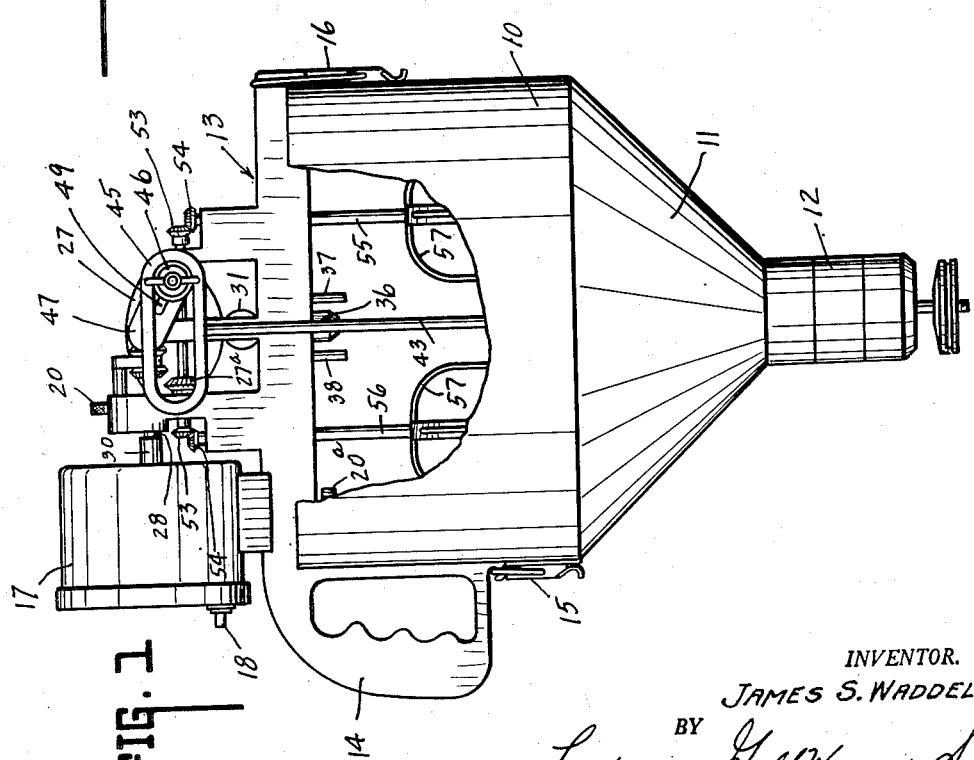
INVENTOR.
JAMES S. WADDELL.
BY
Lockwood, Galt, Woodard & Smith
ATTORNEYS.

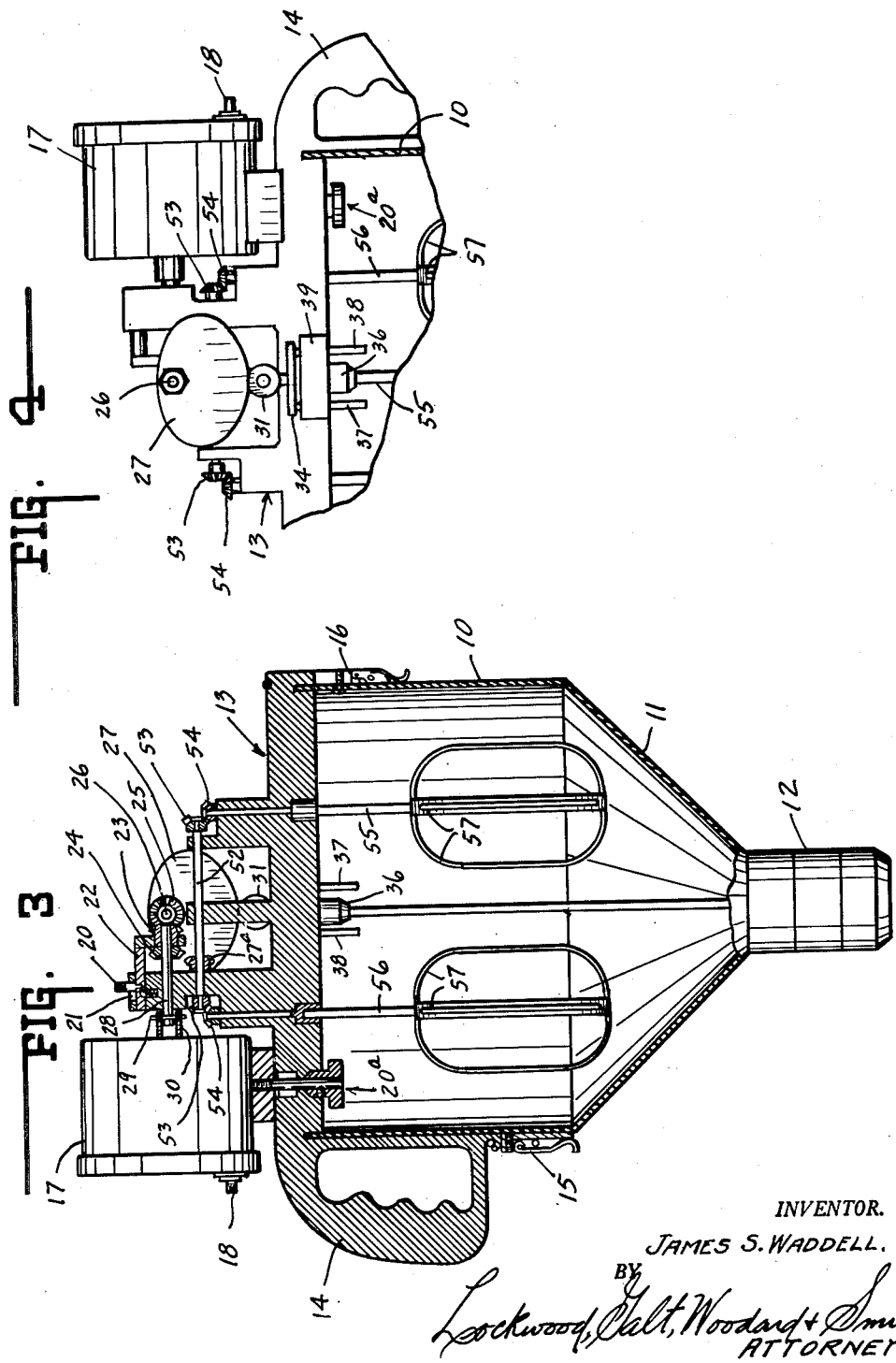

United States Patent Office 2,797,652
Patented July 2, 1957

2,797,652

DOUGHNUT MAKING MACHINE

James S. Waddell, Brownsburg, Ind.

Application January 3, 1956, Serial No. 557,053

2 Claims. (Cl. 107—14)

This invention relates to a doughnut making machine, and more particularly to a relatively small portable machine for feeding rings of dough into cooking vessels of heated oil or the like.

Conventional doughnut making machines are characterized by a size which makes them bulky and unwieldy insofar as movement from place to place is concerned. Actually they are intentionally so designed since most of them are fixed in one place and used there only. In those instances, however, where small restaurants or the like are involved there is no need for the large sized and permanently affixed machine because but relatively few of the doughnuts are sold per day. Consequently the aforementioned conventional machines are impractical for such small restaurant owners. It is, therefore, the primary object of this invention to provide a small, compact and portable unit for use by those whose production of doughnuts is relatively limited.

It is a further object of the present invention to provide a machine having new and improved structural parts which simplify the action of the doughnut making machine discs, and reduce the number of working parts that heretofore have been believed to be necessary.

It is a still further object of the present invention to provide a doughnut making machine which employs a new and improved coupling for alternately actuating the doughnut forming discs on the one hand and the beaters on the other.

The full nature of the invention will be understood from the accompanying drawings and the following description and claims.

In the drawings:

Fig. 1 is a side elevation view of the invention with parts thereof broken away.

Fig. 2 is a transverse vertical section view.

Fig. 3 is a longitudinal vertical section view.

Fig. 4 is a side elevation view of the upper portion of the invention on a side thereof opposite to the side illustrated in Fig. 1.

In the drawings a hopper 10 is provided for reception of the batter used to make the doughnuts, the hopper having the conventional depending conical portion 11 which itself terminates in the cylindrical spout 12.

Mounted across the upper face of the hopper is a cross member shown generally at 13 having the handle 14. This cross member is detachably connected to the hopper as shown particularly in Figs. 1 and 3, through the medium of the toggle link type latches 15 and 16.

Mounted adjacent one end of the cross member is the electric motor 17, it having the button 18 which may be pressed to start it. This motor is supported upon the cross member by means of the nut and bolt arrangement shown generally at 20 in Figs. 3 and 4.

Prior to starting the motor a vertically extended knurled knob 20 is manually moved inwardly, i. e. towards the axis of the hopper. This knob extends through the slot 21 which permits of its reciprocal to and fro movement, and extends into the horizontal portion of a fork 22. Connected to the vertical or depending portion of the fork is a pair of oppositely disposed miter gears 23 and 24.

Once the knob is pushed inwardly away from the motor to the position shown in Fig. 3, miter gear 23 will mesh with miter gear 25 which is supported through the medium of a nut and bolt 26 to one face of the elliptical cam 27. On the other hand, when the knob is moved outwardly towards the motor, miter gear 23 is disengaged from miter gear 25 but gear 24 then meshes with miter gear 27a as hereinafter described. These gears 23 and 24 are mounted on one end of shaft 28, the opposite end of the shaft being pinned at 29 to the coupling 30 which is driven by the motor.

The peripheral edge of the elliptical cam engages a bearing 31 which is journaled in the head portion 32 of shaft 33. A flange 34 is carried by this shaft, and one end of return-spring 35 bears against its lower face. The spring is nested in the socket 36 which is fitted within the cross-member as shown particularly in Fig. 2.

As the cam turns about its pivot 26 the shaft is forced downwardly against the bias of the spring by the engagement of the peripheral edge of the cam with the bearing. As the cam continues to rotate, the return-spring forces the shaft upwardly, the bearing still being in abutment with the peripheral edge of the cam. This vertical movement of the shaft is controlled and guided by a pair of depending pins 37 and 38 which extend downwardly from the flange 34 through the adjacent portion 39 of the cross member.

The lower portion of the shaft 33 is mounted in spider 40 having a centrally located boss 41, the ends of the spider being slidably engageable with the walls of the neck 12. At the extreme lower end of this shaft is threaded a cutting disc 42, the disc serving the conventional purpose of forming the hole in the doughnut.

A second shaft 43 is provided, this shaft carrying disc 44 which is used to compress the dough from the hopper into the reduced neck portions thereof. This shaft extends upwardly through a bore formed in the cross member and mounts at its upper end a guide 45. The guide is in the shape of an ellipse or oval and comprises a central opening for reception therewithin in abutting relationship of the roller 46. The roller is journaled in the arm 47 through the medium of a screw having a wing nut 48. The arm is secured to the shaft of the same bolt 26 that extends through the cam. In short, the same rotation imparted to the cam is also imparted to this arm. As a result the guide is forced upwardly and downwardly with the arcuate movement of the arm by the roller 46 which has some lost motion characteristics because of the provision of the slot 49 formed within the arm. The shaft, of course, moves vertically with the guide.

By reason of the necessary length of the respective shafts 33 and 43 it is desirable to provide intermediate their ends an alignment clamp 50. This clamp may be attached to shaft 43 by means of a set screw 51 and rides on shaft 33 thereby keeping both shafts in position.

When it is desired to mix the batter at any stage during the doughnut forming operation it is necessary only for the operator to push the knob 20 towards the motor, i. e. outwardly relative to the axis of the hopper whereupon the miter gear 23 disengages from miter gear 25 and gear 24 is moved into engagement with miter gear 27a (see Figs. 1 and 3). Any further rotation of shaft 28 is thus imparted to miter gear 27a which is mounted upon shaft 52 extending horizontally between upstanding portions of the cross member and is journaled in bores formed therewithin. The opposite ends of this shaft mount gears 53 which are in mesh with gears 54 which themselves are connected to the upper ends of beater shafts 55 and 56.

The beater paddles 57 are connected to these last mentioned shafts and rotate with them.

In operation the machine is started by pressing the button 18 of the motor. In the event it is desired to feed dough into the cooking vessel the knob 20 is manually moved to the right (see Fig. 3) whereupon shaft 28 which is turned by the motor and which has miter gear at its end will cause miter gear 25 to rotate and with it the elliptical cam. Since the cam abuts the bearing 31 the shaft 33 to which the bearing is connected will be moved upwardly and downwardly against the constraint of the spring which is housed in the socket within the cross member. Simultaneous with this reciprocal and vertical movement of shaft 33 is the movement of shaft 43. This results from the action of the arm 47 which is rotated by the bolt 26 which in effect serves as a pintle and is the same bolt which rotates the cam. With the rotation of the arm the guide 45 is alternately lowered and raised thereby reciprocating the disc 44. When it is desired to rotate the beaters as distinguished from operating the shafts, it is necessary only for the operator to move the knob to the left (see Fig. 3) whereupon the miter gears 23 and 25 are disengaged and miter gear 24 meshes with spur gear 27. This results in the rotation of shaft 52 which through the medium of the gears 53 and 54 causes the shafts to which the beaters are connected to rotate. It is apparent the machine may easily be lifted and moved by the operator from place to place as desired, the machine being of sufficiently light weight to make this possible.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A doughnut making machine comprising a hopper terminating in a depending spout, a pair of vertically spaced and relatively movable discs slidable in said spout to form doughnuts, a cross member mounted transversely of said hopper, a first shaft carrying one of said discs at one end and extending upwardly through said other disc and said member, said shaft having a bearing journaled in its upper end, a cam journaled on said cross member, spring means mounted in said member and associated with said shaft for biasing said bearing upwardly into engagement with the peripheral surface of said cam, a second shaft carrying the other of said discs at one end and extending upwardly through said cross member, said last mentioned shaft having an elliptical guide mounted at its upper end, a roller mounted within said guide, an eccentric arm connected to said roller at one end, a transversely mounted shaft connected to said cam adjacent one end, the other end of said last mentioned shaft being connected to said arm at its other end, said arm and said cam being rotated together by said last mentioned shaft, an electric motor mounted on said cross member, and means drivingly connecting said motor and said last mentioned shaft for imparting vertical reciprocating motion through said cam and said arm to said shafts.

2. A doughnut making machine comprising a hopper terminating in a depending spout, a pair of vertically spaced and relatively movable in timed relation discs slidable in said spout to form doughnuts, a cross member mounted transversely of said hopper, a first shaft carrying one of said discs at one end and extending upwardly through said other disc and said member, said shaft having a bearing formed at its upper end, a cam carried by said cross member immediately above said bearing and in vertical alignment therewith, resilient means associated with said member and said shaft for biasing said bearing upwardly into abutment with the peripheral surface of said cam, said shaft being vertically reciprocal by the rotating motion of said cam, a second shaft carrying the other of said discs at one end and extending upwardly through said cross member, said last mentioned shaft mounting an interiorly hollow elliptical guide at its upper end, a roller mounted within said guide, an eccentric arm connected to said roller at one end, a transversely mounted shaft carried by said member and connected at one end to said cam and at the other end to said arm, the rotation of said last mentioned shaft causing said cam and said arm to rotate, power means mounted on said cross member and drivingly connected to said last mentioned shaft whereby upon the rotation of said last mentioned shaft said first and second shafts are vertically reciprocated in timed relation, and vertically extending guide members connected to said first shaft and extending through said cross member for guiding said first shaft in its vertical movement.

References Cited in the file of this patent

UNITED STATES PATENTS

| | | |
|---|---|---|
| 297,482 | Wilson | Apr. 22, 1884 |
| 509,897 | Wilcox | Dec. 5, 1893 |
| 774,680 | Lynds | Nov. 8, 1904 |
| 1,071,747 | Hutchinson | Sept. 2, 1913 |
| 1,790,347 | Hawkins | Jan. 27, 1931 |
| 2,634,691 | Flockhart | Apr. 14, 1953 |
| 2,669,949 | Cottingham | Feb. 23, 1954 |
| 2,692,124 | Mendoza | Oct. 19, 1954 |